No. 659,568. Patented Oct. 9, 1900.
E. BERNARDI.
MOTOR VEHICLE.
(Application filed July 11, 1898.)
(No Model.) 4 Sheets—Sheet 1.
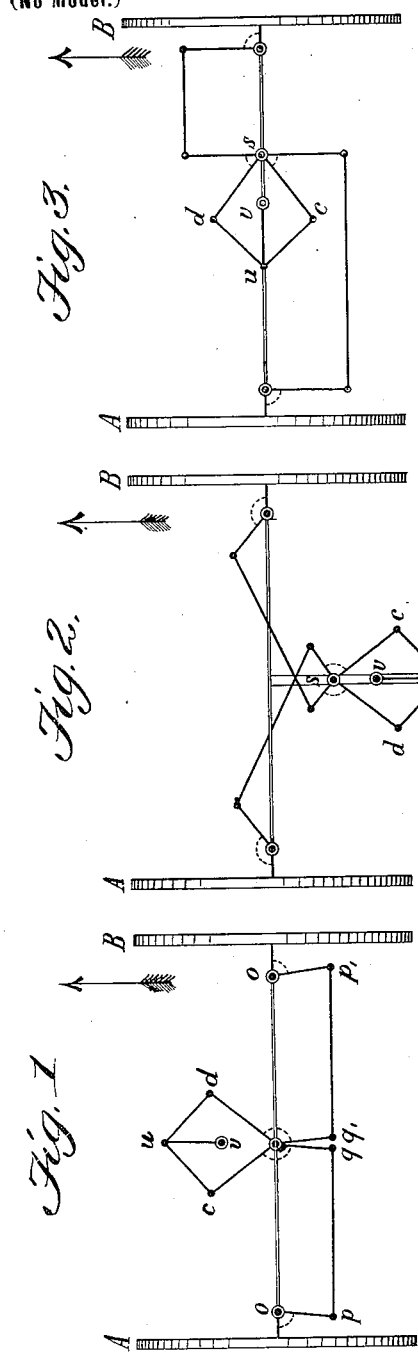
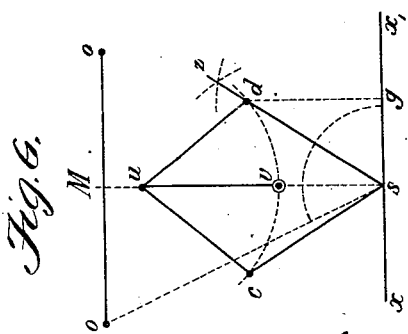
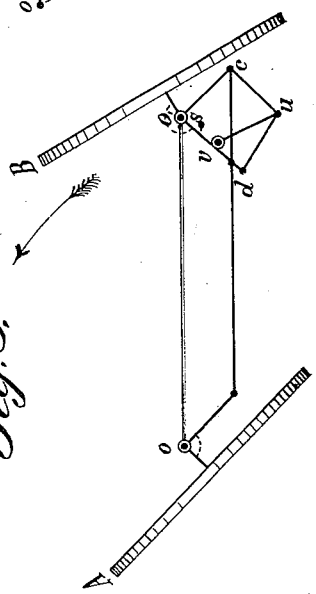
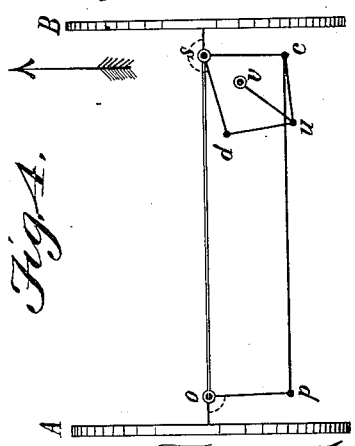
Witnesses:
Inventor
Enrico Bernardi
By James L. Norris
Atty.

No. 659,568. Patented Oct. 9, 1900.
E. BERNARDI.
MOTOR VEHICLE.
(Application filed July 11, 1898.)

(No Model.) 4 Sheets—Sheet 2.

Witnesses:
J. B. Keeler
Bruce S. Elliott

Inventor
Enrico Bernardi
By James L. Norris
Atty.

No. 659,568. Patented Oct. 9, 1900.
E. BERNARDI.
MOTOR VEHICLE.
(Application filed July 11, 1898.)
(No Model.) 4 Sheets—Sheet 3.
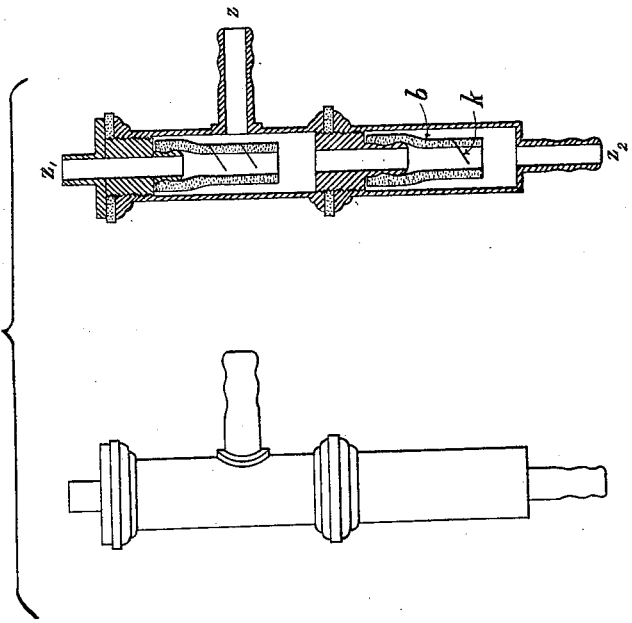
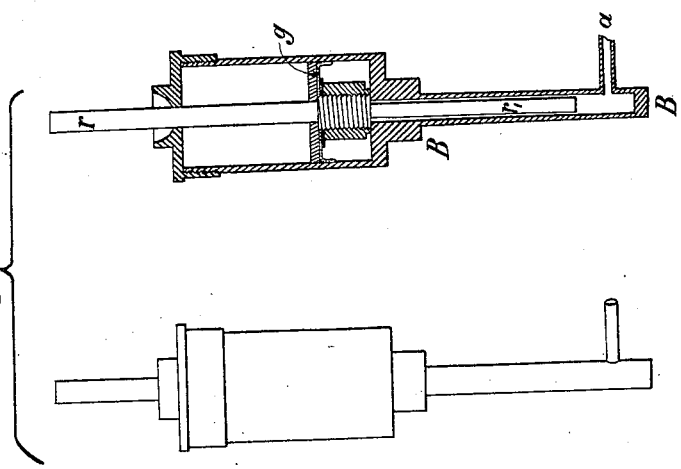
Witnesses:
Inventor
Enrico Bernardi
By James L. Norris,
Atty.

No. 659,568. Patented Oct. 9, 1900.
E. BERNARDI.
MOTOR VEHICLE.
(Application filed July 11, 1898.)
(No Model.) 4 Sheets—Sheet 4.
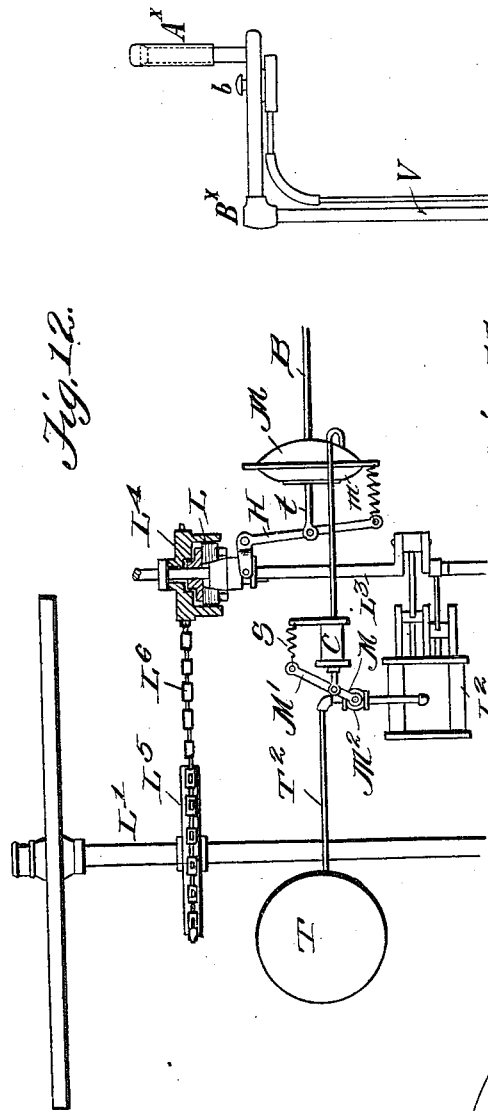
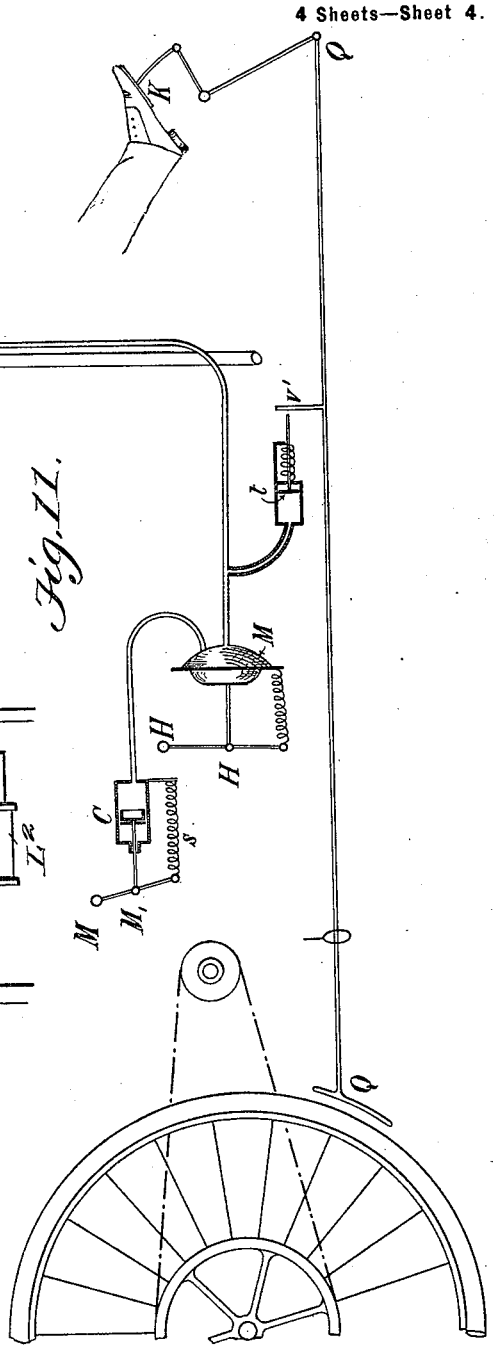
Witnesses:
Inventor
Enrico Bernardi
By James L. Norris
Atty.

UNITED STATES PATENT OFFICE.

ENRICO BERNARDI, OF PADUA, ITALY.

MOTOR-VEHICLE.

SPECIFICATION forming part of Letters Patent No. 659,568, dated October 9, 1900.

Application filed July 11, 1898. Serial No. 685,654. (No model.)

*To all whom it may concern:*

Be it known that I, ENRICO BERNARDI, a subject of the King of Italy, residing at Padua, University of Padua, in the Kingdom of Italy, have invented certain new and useful Improvements in and Relating to Motor-Vehicles, of which the following is a specification.

The drivers of motor-vehicles of any type should be able to control the direction of the motion of the said vehicles and at the same time start and stop the same and increase or decrease its speed. It is very advantageous that the driver should be able to start or to regulate the speed of the vehicle without for a moment releasing the handle by means of which he steers it, without turning around, or being distracted even momentarily from that which should form his principal preoccupation—that of avoiding the obstacles which the vehicle may encounter in its progress. This object is attained in an exceedingly simple and practical manner by means of the arrangement which forms the subject of this invention.
In the accompanying drawings I have represented, by way of example, a motor-vehicle provided with the improved steering and speed-changing device, in which—

Figure 8:
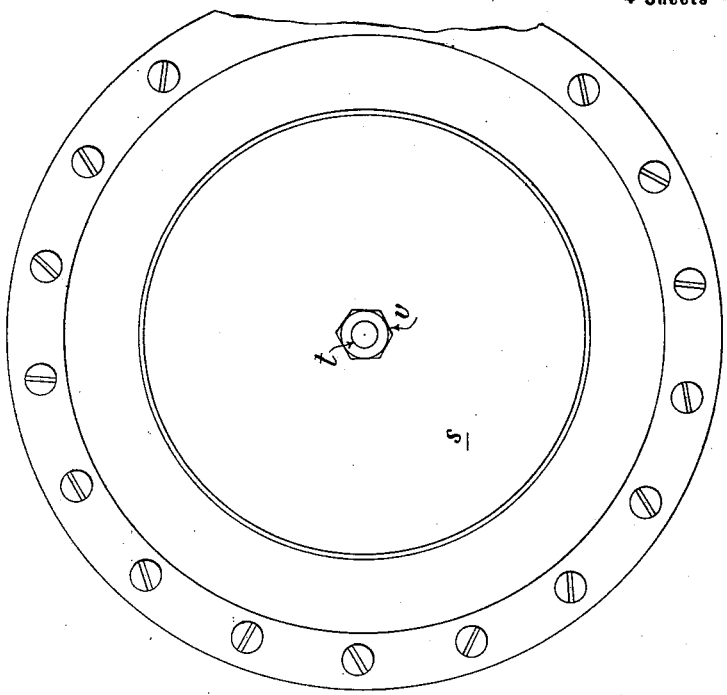
Figure 7:
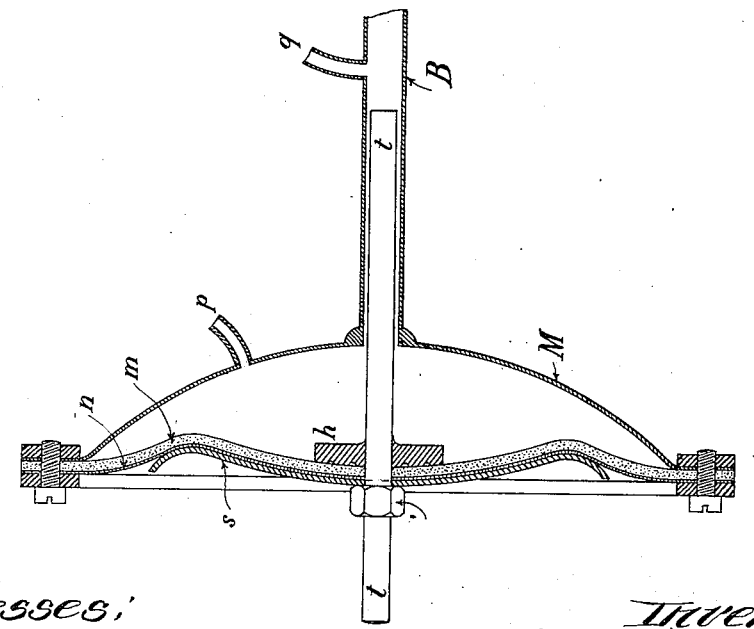

Figures 1 to 5 represent, diagrammatically, various forms of the fore carriage of the vehicle furnished with the device employed for steering and which is actuated by means of the same handle which is used for actuating the starting and speed-changing mechanism.
Fig. 6 is a diagram showing the path of the steering mechanism, which is hereinafter explained. Figs. 7 and 8 show a vertical section and end view, respectively, of an air-receiver such as I generally employ. Fig. 9 is an elevation and vertical section, respectively, of another form of air-receiver. Fig. 10 is a suction-valve and a force-valve, both placed together on the same tube; and Fig. 11 is a diagrammatical view showing the motor-vehicle provided with the devices for starting and stopping the same and for varying the speed. Fig. 12 is a sectional plan view of the clutch connection between the motor and the axle of the vehicle.
I will first of all consider the steering mechanism.

As is well known, the proper manner of effecting the steering of motor-vehicles and velocipedes having three or four wheels is by causing each of the wheels of the fore carriage to turn separately instead of causing the fore carriage to turn as a whole, as is the case with ordinary carriages, vans, and the like. The stability of the vehicle is thereby increased, the operation of steering is rendered less fatiguing, and the shocks to the wheels which are being turned are not transmitted to the hands of the driver. The turning movements of the wheels of the fore carriage should be so coördinated that the meeting-point of the geometric axes of the wheels which are capable of turning is invariably situated in the vertical plane containing the geometric axis of the hind wheel in the case of three-wheeled vehicles or the geometric axis of the two hind wheels if the vehicle is four-wheeled. If this condition is satisfied only by a rough approximation and for limited turning angles, as is the case with devices hitherto employed, one or more wheels of the vehicle slip along the plane of the road in turning, the tires are damaged, the wheels and their supports wear very rapidly, and the control of the steering becomes difficult.

The subject of this invention is in the first place a device which rigorously satisfies the above-mentioned condition and in which the connection between the two steering-wheels is formed by means of simple jointed rods.

The principal portion of the device consists of a jointed quadrilateral $s\ c\ u\ d$, Fig. 1, the apex $s$ only of which is fixed to the frame of the vehicle and in an arm $v\ u$ capable of rotation around a pivot $v$, also fitted upon the frame and connecting at $u$ with the rods $c\ u$ $d\ u$ of the quadrilateral. The connection between the two other rods $s\ c$ and $s\ d$ of the quadrilateral and the steering-wheel A and B should be effected in such a manner as to oblige these latter to describe in turning angles respectively equal to those described by the rods. This is the only condition which must be satisfied, and it is obtained in the most simple and practical manner possible by the use of jointed parallelograms, such as those $s\ q\ p\ o$ and $s\ q'\ p'\ o'$, represented in Fig. 1. In this arrangement the rod $c\ s$ is an arm of a bent lever $c\,s\,q$, the other arm $s\,q$ of which forms, with the connecting-rod $q\,p$, the crank $o\,p$, rigidly connected with the vertical steering-axis of the wheel A, and the fixed side $o\,s$ a jointed parallelogram $s\,q\,p\,o$. This connection obliges the wheel A and the rod $c\,s$ to describe equal angles when they turn, and the same is the case with the rod $d\,s$ and the wheel B.

In order to control the steering mechanism of the vehicle, any of the parts which compose such mechanism may be acted upon. It is usually preferable to cause the arm $v\,u$ to turn around $v$ by means of a lever $A^{\times}\,B^{\times}$, provided with a handle, Fig. 11, such lever being rigidly fixed upon a vertical shaft $v$, to which the arm $v\,u$ is rigidly attached. The position of the mechanism is that indicated in the horizontal view, Fig. 1, when the vehicle is traveling in a straight line. If the arm $v\,u$ is caused to turn either to the right or to the left hand, the quadrilateral $s\,c\,u\,d$ becomes deformed and the rods $s\,c$ and $s\,d$ turn around $s$ and take with them the wheels A B, which for their part turn around the respective axes $o$ and $o'$ in such a manner as to cause the vehicle to turn toward the right or toward the left hand at the will of the driver. By determining the length of $v\,u$ and of the members of the quadrilateral $s\,c\,u\,d$ in the manner which is hereinafter explained perfect steering is obtained—that is to say, without any slip, however small the radius of the curve described may be.

It will of course be understood that Fig. 1 represents one only of the methods of arranging the mechanism, consisting of the quadrilateral $s\,c\,u\,d$ and of the arm $v\,u$, hinged at $u$ and turning around the fixed points $s$ and $v$, respectively. This mechanism may be arranged at any point upon the vehicle provided that all its parts are displaced in the same horizontal plane and provided also that the connection between the rods $s\,c$ and $s\,d$, on the one hand, and the wheels A B, on the other hand, is effected in such a manner that the angles described by the said rods are respectively equal. One or other of the steering-wheels cannot, however, be connected indifferently with one or other of the rods $s\,c$ and $s\,d$ of the quadrilateral. Regard must be had to the following: We will term "right-hand wheel" and "left-hand wheel" the wheel which is on the right and left hand, respectively, of the driver of the vehicle. We will term "right-hand rod" and "left-hand rod" of the quadrilateral the rod which is situated to the right and left hand, respectively, of a person standing up at $s$ and looking toward $u$. Now the right-hand steering-wheel should be connected with a right-hand rod of the quadrilateral and the left-hand steering-wheel with a left-hand rod. Some of the different ways in which the mechanism may be arranged are represented in Figs. 1, 2, 3, and 4, all of which correspond to a straight travel of the vehicle. Similar parts are indicated by like letters of reference to those in Fig. 1. The arcs shown in dotted lines indicate that the two rods, in the angle between which the arc is drawn, are rigidly connected one with the other in such a manner as to constitute a single bent lever. It should nevertheless be noticed that as regards Fig. 4 the right-hand rod $s\,d$ of the quadrilateral is fixed directly upon the vertical steering-axis of the right-hand wheel, while the left-hand rod $s\,c$ is loose upon this same axis and connected with the left-hand wheel by means of the jointed parallelogram $s\,c\,p\,o$, of which it forms one of the sides. Fig. 5 represents the same device as that shown in Fig. 4 when the vehicle is turning toward the left hand.

In order to calculate the lengths of the members of the quadrilateral and the length of the arm $v\,u$ in such a manner as to obviate any slip, whatever may be the angle of turning, the method represented in Fig. 6 is adopted, in which $o$ and $o'$ are the horizontal projections of the axes around which turn the steering-wheels and $x\,x'$ is a straight line parallel with $o\,o'$, representing the geometric axis of the rear wheel or wheels of the vehicle. From the middle point M of the straight line $o\,o'$ the line M $s$ is drawn at right angles to $o\,o'$. Then the straight line $s\,o$ and the straight line $s\,z$, bisecting the angle $o\,s\,x'$, are drawn. A length $s\,d$ is taken upon $s\,z$, commencing at $s$, and from $d$ is drawn the line $d\,g$ at right angles to $x\,x'$. With center $d$ and radius equal to $d\,g$ is described an arc of a circle which cuts $s$ M at $u$. With the same radius and with center $u$, M $s$ is cut at $v$. $s\,c$ and $c\,u$, arranged symmetrically to $s\,d$ and $u\,d$ with respect to M $s$, are then drawn, and in the quadrilateral $s\,c\,u\,d$ and in the straight line $v\,u$ a geometric representation to the scale of the drawing is obtained of the quadrilateral and of the arm composing the articulated system in question. The length of the rods of the quadrilateral $s\,d = s\,c$ remains fixed. For practical reasons this length should preferably be between one-fifth and one-sixth of $o\,o'$; but the handle $A^{\times}$ does not only supply the means of steering in a theoretically-perfect manner without the least slip, but also of starting, accelerating, retarding, or stopping the vehicle without the driver being obliged to turn to one side or the other. This object could only be attained by means of extremely complicated and unpractical devices if tension-rods, levers, chains, &c., were resorted to, these parts being intended to transmit predetermined motions to the slide-valves and other parts for regulating the motor independently of the movement of rotation of the operating-lever. This result is, however, attained by means of my invention in a very simple manner by the employment of pneumatic or hydraulic transmission.

There is connected with the lever or with the handle, by means of which the steering of the vehicle is controlled, a small pump, the movable part of which may consist either of the handle of the operating-lever itself or of an india-rubber bulb arranged in such a manner that it may be pressed and released alternately by the driver without his ceasing to control the steering of the vehicle with the same hand. The air or water under pressure supplied by the pump is conducted to the slide-valve which it is desired to control by means of a small tube, which may be of metal as regards all the parts which maintain an invariable position with respect to the operating lever or handle and to the frame of the vehicle or motor and which should be of india-rubber or some other flexible material at those portions which are attached on one side to the operating lever or handle or to the parts which participate in its movement and on the other side to the frame. Generally speaking, the tube conducting the compressed air or other fluid should be flexible in all those portions in which when the vehicle is turning a movement of the tubing takes place. The pump above mentioned acts as a transmission apparatus. The receiving device M, Fig. 11, may consist of a casing or receptacle provided with a flexible diaphragm or of a cylinder having a tight piston.

In the receiving apparatus shown in Figs. 7 and 8, M is a metal capsule or cover; $s$, a metal plate; $m$, a sheet of india-rubber; $n$, a canvas lining, and $tt$ a rod which compels the center of the diaphragm to move in a straight line. $h$ is a metal disk or washer soldered or welded onto the rod $tt$. It will be understood that when compressed air is admitted through the tube $q$ of the cylindrical piece or sleeve B, Fig. 7, $p$ being kept closed, or, conversely, when compressed air is admitted through $p$ and $q$ remains closed, this will inflate the diaphragm $m$, which, with the assistance of the nut $v$ and disks $s$ and $h$, will move to the left the rod $tt$, the whole portion of which to the right of $h$ is of square section. The rod $tt$ in thus moving to the left operates a friction-clutch L, making and breaking connection between the axle $L'$ of the vehicle and the motor $L^2$, such clutch being connected to the rod $tt$ in any convenient manner.

Another form of receiving apparatus is illustrated in Fig. 9, where $g$ is a tightly-fitting piston, $r$ the piston-rod, and $r'$ a counter-rod of square section adapted to enter a cylindrical sheath B B. By injecting air under pressure through $a$, $g$ is raised. When acting through the medium of the rod $r$, it will operate the friction-clutch or the motor-regulator valve connected therewith.

The pneumatic operating device generally to be adopted consists of an india-rubber ball, which by means of two suitably-constructed valves is made to operate after the style of an air-pump. Fig. 10 shows the suction-valve and the force-valve of our general type of novel pneumatic arrangements, both valves being placed together on the same tube. Each valve is formed of a short length of stout india-rubber tube $b$, near one extremity of which there are provided one or two oblique cuts $k$, that do not entirely penetrate into the tube. The force-valve has one such cut only, while the suction-valve has two. The portions of the tubes $b$ which are not cut act as a hinge and the orifices situated at their ends open whenever the pressure prevailing within the tubes exceeds the external pressure and close in the reverse case. It will be understood that by applying the india-rubber ball to the tube $z$ and alternately pressing it in the hand air will be drawn in by the tube $z'$ from without, while in the tube $z^2$ the air will be forced back. The air thus compressed is conveyed to the "receiving" device through a tube of small diameter, which may be partly metal, but should be constructed of india-rubber or other flexible material in those parts upon which the facility for starting the front wheel of the cycle of the motor-car depends.

At any desired point in the air-transmission tube, which is connected with the operating-lever or with its handle, is provided an orifice closed by a small valve, which the driver can open at will by pressing a button $b$ or in any other suitable manner. Upon inclosing this orifice the compressed air escapes and a counter-spring returns the diaphragm and the slide-valve attached thereto to their position of rest.

It should be noticed that the arrangement may be such that each stroke of the pump gives rise only to a displacement of the slide-valve to be actuated corresponding to an exact submultiple of the total stroke which the slide-valve is capable of effecting. It follows that the driver may without moving graduate the movement of the slide-valve and the effects which result therefrom according to the number of strokes of the pump.

By way of example only I will describe a method of practical application of pneumatic or hydraulic transmission to the steering mechanism of a three-wheeled motor-vehicle.

In the form of motor-vehicle represented in Fig. 11 the driver grasps the handle $A^\times$ and by turning the crank or lever $A^\times B^\times$, and consequently the shaft $v$, may control in any desired manner the steering of the fore carriage by means of the quadrilateral above described. The handle $A^\times$ is capable of sliding vertically and acts as the cylinder of an air-pump with fixed piston in such a manner that in imparting to the handle a vertically-reciprocating motion the driver is able to compress the air in the conduit of the pneumatic-transmission device described. Beneath this handle is arranged the button $b$, in pressing which the compressed air contained in the conduit is allowed to escape slowly. The motor $L^2$, which is preferably a benzene-motor, the fuel for which is supplied from the tank T through pipe $T^2$, is maintained in motion even when the vehicle is at rest. The main shaft $L^3$ of the motor transmits the motion by means of sprocket-wheels $L^4$ and $L^5$ and chain $L^6$ to the rear wheel of the vehicle. The engagement must be effected by means of a friction-clutch L, acting gradually and operated by a lever H, which is in turn actuated by a flexible diaphragm $m$, contained in the casing M, which receives the compressed air through the pneumatic-transmission conduit B. By slowly actuating the pump $A^\times$ the membrane is gradually caused to swell, and the gradual engagement of the motor with the vehicle and the easy starting of this latter without shocks is effected. If while the vehicle is running the button $b$ is compressed, which can be done by sliding the hand along the handle $A^\times$ without releasing it, the air contained in the conduit escapes gradually, the motor is slowly thrown out of gear, and the vehicle slows down or stops entirely, according to the desire of the driver.

I have thus far considered in what manner it is possible while still continuing to control the steering to produce the gradual starting of the motor-vehicle, its retardation, stopping, &c.; but the supply-pipe $T^2$ for the motor is provided with a valve $M^2$, arranged in any desired manner, by means of which the speed of rotation may be modified. This valve or other equivalent part is operated by means of a lever M M', which is capable of pivoting around M and which is connected with the piston of a cylinder C of the kind represented in Figs. 11 and 12, operated by the air contained in the pneumatic transmission-conduit. A spring $s$ prevents the piston of the cylinder C from being displaced until the air reaches a pressure sufficient for completing the engagement of the motor with the vehicle. It follows that at the first strokes of the pump $A^\times$ the motor-vehicle starts and finally attains a speed corresponding to that of the motor. If the pump $A^\times$ is still actuated slowly, the spring $s$ yields to the action of the piston of the cylinder C, and the valve $M^2$ of the motor is displaced in its turn in such a manner that the speed is increased. The speed of the vehicle also increases until the maximum speed is attained. It is obvious that by pressing the button $b$ the same gradations of speed may be produced inversely as have already been passed through from the time of starting in the gradual acceleration, all this taking place without its being necessary to release the handle $A^\times$ and having always in the hand the means of controlling the steering. It should be noticed that upon stoppage—that is to say, when the compressed air has completely escaped—the spring $s$ automatically returns the lever M M' and valve $M^2$ fixed thereto into the position corresponding to the minimum speed of the motor, and consequently this latter consumes during the stoppage only the quantity of benzene which is absolutely necessary to enable it to run free and to be ready for the starting of the motor-vehicle, all this taking place in a strictly automatic manner, while in benzene or petroleum motors as hitherto constructed the motor when the vehicle is stopped continues to rotate at its maximum speed and the driver is obliged to act in order to reduce the speed of the motor, and consequently the consumption of fuel, during periods of stoppage. It should likewise be added that the brake should not enter into action except when the motor is entirely out of gear. This result may be obtained automatically by the application of the pneumatic conduit. In the case of the motor-vehicle represented in Fig. 11, for example, the brake is operated by means of the pedal K, the pressure from which is transmitted to the brake-shoe by means of the rod Q Q. This latter is provided with a nose $v'$, which when the brake is operated opens the valve $t$, thereby allowing the air to escape from the conduit. Consequently the driver by a single movement reduces the speed of the motor to its minimum, effects the disengagement of the motor from the vehicle, and brings the brake into action in order to immediately stop the vehicle.

What I claim is—

1. A motor-vehicle in which the steering mechanism and the speed-regulating mechanism are controlled by means of a single handle, the said handle being used: first, for operating the actuating-shaft of the steering mechanism, consisting preferably of another crank or lever rigidly fixed upon the said actuating-shaft and connected with the apex of a jointed quadrilateral opposite to that which is fixed to the frame of the vehicle, a device of any suitable kind for causing the two steering-wheels to describe respectively the same angles as are described by the two rods of the quadrilateral terminating at the fixed apex at the frame; and, second, as the movable cylinder of a pump for forcing a fluid into a conduit terminating at the motor and comprising one or more flexible portions in order that it may be able to adapt itself to any movement of the vehicle, by means of which conduit the driver, without turning round or releasing the handle by means of which he controls the steering, is able to actuate the parts serving to start, regulate and stop the movement of the vehicle.

2. The combination in a motor-vehicle in which the steering mechanism and the speed-changing mechanism are controlled by a single handle, of an air-receiving device consisting of a casing containing a flexible diaphragm or a cylinder provided with a piston connected to the motor regulator-valve or friction-clutch substantially as described.

3. The combination in a motor-vehicle in which the steering mechanism and the speed-changing mechanism are controlled by a single handle, of a suction and force valve arranged together in the same tube, and each consisting of a short length of rubber tube provided with one or two oblique cuts the outer case or tube being connected to the receiving device substantially as described.

In witness whereof I have hereunto set my hand in presence of two witnesses.

ENRICO BERNARDI.

Witnesses:
  GIOROMI MIARI,
  FRANCESCO GIUSTI.